(12) United States Patent
Konaya et al.

(10) Patent No.: US 8,866,352 B2
(45) Date of Patent: Oct. 21, 2014

(54) ALTERNATOR FOR VEHICLE WITH HEAT DISSIPATING FIN

(75) Inventors: Kazuyoshi Konaya, Anjo (JP); Hiroshi Hamada, Anjo (JP); Mikio Mashino, Kariya (JP); Seiji Kondoh, Kariya (JP)

(73) Assignee: DENSO CORPORATION, Kariya (JP)

( * ) Notice: Subject to any disclaimer, the term of this patent is extended or adjusted under 35 U.S.C. 154(b) by 142 days.

(21) Appl. No.: 13/492,533

(22) Filed: Jun. 8, 2012

(65) Prior Publication Data

US 2012/0326572 A1 Dec. 27, 2012

(30) Foreign Application Priority Data

Jun. 23, 2011 (JP) ................................. 2011-138999
Feb. 2, 2012 (JP) ................................. 2012-020877

(51) Int. Cl.
*H02K 9/06* (2006.01)
*H02K 11/04* (2006.01)

(52) U.S. Cl.
CPC ................ *H02K 9/06* (2013.01); *H02K 11/046* (2013.01)
USPC .......................... 310/60 R; 310/68 D; 310/64

(58) Field of Classification Search
USPC .............................. 310/60 R, 68 D, 52, 64, 71
See application file for complete search history.

(56) References Cited

U.S. PATENT DOCUMENTS

| | | |
|---|---|---|
| 2002/0140300 A1 | 10/2002 | Shichijyo |
| 2004/0000817 A1 | 1/2004 | Hirsou et al. |
| 2004/0041476 A1 | 3/2004 | Ihata et al. |
| 2004/0051409 A1 | 3/2004 | Nakamura et al. |
| 2004/0256924 A1 | 12/2004 | Ueda et al. |
| 2007/0046114 A1 | 3/2007 | Kondo et al. |
| 2008/0316786 A1* | 12/2008 | Murakami et al. ............ 363/141 |

FOREIGN PATENT DOCUMENTS

| | | |
|---|---|---|
| CN | 1543039 A | 11/2004 |
| JP | U-57-104595 | 6/1982 |
| JP | 60-144291 | * 2/1984 |
| JP | U-60-144291 | 9/1985 |
| JP | A-2004-112860 | 4/2004 |
| JP | A-2004-147486 | 5/2004 |

(Continued)

OTHER PUBLICATIONS

Jun. 18, 2013 Office Action issued in Japanese Patent Application No. JP 2012-020877 (with translation).

(Continued)

*Primary Examiner* — Tran Nguyen
*Assistant Examiner* — Leda Pham
(74) *Attorney, Agent, or Firm* — Oliff PLC (57) ABSTRACT

An alternator for a vehicle is provided which is equipped with a heat dissipator and a cooling air generator. The heat dissipator is disposed in a rectifier to cool rectifying devices. The cooling air generator generates a flow of cooling air to the heat dissipator. The heat dissipator has a plurality of sub-fins formed thereon. Each of the sub-fins is defined by a combination of a protrusion and a recess. The protrusions are formed on one of opposed major surfaces of the heat dissipator, while the recesses are formed on the other major surface, one in coincidence with each of the protrusions in a thicknesswise direction of the heat dissipator. This permits the heat dissipator to be pressed to form the protrusions and the recesses to make the sub-fins simultaneously, thus allowing a heat-dissipating area to be increased to ensure a desired degree of heat capacity thereof.

12 Claims, 10 Drawing Sheets

(56) References Cited

FOREIGN PATENT DOCUMENTS

| | | |
|---|---|---|
| JP | B2-3707477 | 10/2005 |
| JP | B2-3775235 | 5/2006 |
| JP | A-2006-149039 | 6/2006 |
| JP | A-2007-68257 | 3/2007 |
| JP | A-2007-175757 | 7/2007 |
| JP | B2-4180385 | 11/2008 |
| JP | A-2009-27906 | 2/2009 |
| JP | A-2011034958 | 2/2011 |
| WO | WO 02/093717 A1 | 11/2002 |

OTHER PUBLICATIONS

Apr. 2, 2014 Office Action issued in Chinese Patent Application No. 201210211927.0 (with translation).

* cited by examiner

ALTERNATOR FOR VEHICLE WITH HEAT DISSIPATING FIN

CROSS REFERENCE TO RELATED DOCUMENT

The present application claims the benefit of Japanese Patent Application Nos. 2011-138999 and 2012-20877 filed on Jun. 23, 2011 and Feb. 2, 2012, disclosures of which are incorporated herein by reference.

BACKGROUND OF THE INVENTION

1. Technical Field of the Invention

The present invention relates generally to an alternator which may be installed in passenger automobiles or trucks, and more particularly to such an alternator having installed therein a heat dissipator which is equipped with heat dissipating fins.

2. Background Art

Typical automotive alternators are equipped with a rectifier which has a positive-side fin radiator and a negative-side fin radiator to cool rectifying devices installed on the positive-side and negative-side fin radiators. Japanese Patent Publication No. 3775235 teaches such fin radiators with circular or elongated holes which are formed by a press to increase heat dissipating area of the fin radiators. The air passes through the holes to cool the rectifying devices. Japanese Patent Publication No. 3707477 also discloses the fin radiators which are formed by the die-casting to have a plurality of sub-fins extending radially. The air passes between the sub-fins to cool the rectifying devices.

The structure of the fin radiators with the circular or elongated holes requires the need for increasing the distance between the holes due to geometrical limitations of press dies. It is, thus, difficult to have as large heat dissipating area as in the structure with the die-casted fin radiators, as taught in the latter publication. Too many circular or elongated holes will result in a decrease in thermal capacity of the fin radiators, which leads to a reduced ability to dissipate the heat. There is room for improvement in the former structure.

The structure of the fin radiators with the sub-fins faces the problem that burrs are formed between every adjacent two of the sub-fins or on portions of the sub-fins which are to be disposed between the dies. It is, thus, necessary to deburr the sub-fins, which results in an increase in production process and production cost. It is also necessary to accurately machine or cut holes in the fin radiators in which rectifying devices are to be press-fit, which will also contribute to an increase in production cost.

SUMMARY OF THE INVENTION

It is an object of this disclosure to provide an alternator with a heat dissipator which is simple in structure and ensures a desired degree of cooing ability to cool a rectifier.

According to one aspect of an embodiment, there is provided an alternator for a vehicle such as a passenger automobile or a truck. The alternator comprises: (a) a frame; (b) a rotor retained by the frame; (c) a stator which is so retained by the frame as to face the rotor, the stator working to produce ac voltage along with the rotor; (d) a rectifier retained by the frame, the rectifier including rectifying devices to rectify the ac voltage into dc voltage; (e) a heat dissipator which is disposed in the rectifier and has a first and a second surface opposed to each other through a given thickness of the heat dissipator, the heat dissipator working to establish an electrical communication between the rectifying devices and cool the rectifying devices; (f) a cooling air generator which generates a flow of cooling air toward the rotor through the heat dissipator in the rectifier; and (g) a plurality of sub-fins provided on the heat dissipator. Each of the sub-fins is defined by a combination of a protrusion formed on the first surface of the heat dissipator and a recess formed in the second surface of the heat dissipator in coincidence with the protrusion in a direction of the given thickness.

The heat dissipator may be made of a plate. The plate may be pressed to form the protrusions and the recesses simultaneously.

The heat dissipator, as described above, has the given thickness between the first and second surfaces. Each of the protrusions and a corresponding one of the recesses are located in coincidence with each other in the direction of the given thickness, thus permitting the heat dissipator to be deformed or pressed to form the protrusions and the recesses to make the sub-fins simultaneously. This allows a heat-dissipating area of the heat dissipator to be increased without need for additional members to ensure a desired degree of heat capacity thereof as compared to when circular or elongated holes are formed in the heat dissipator. The press forming of the sub-fins results in no burr between adjacent two of the sub-fins, thereby eliminating the need of an additional process of finishing the sub-fins, which leads to a decrease in production cost of the rectifier.

The sub-fins may be so shaped as to extend radially from an axis of rotation of the rotor. This results in enhanced efficiency in making flows of the cooling air along the sub-fins toward the axis of rotation of the rotor, which improves the ability in cooling the rectifying devices.

Each of the recesses of the sub-fins may have a length which extends in a radius direction of the rotor and has an end portion changing in depth thereof at a given rate. Each of the protrusions of the sub-fins may have a length which extends in the radius direction of the rotor and has an end portion changing in height thereof at a given rate. This avoids the generation of a turbulent flow of air around ends of the sub-fins and improves the efficiency in creating the flow of cooling air.

The heat dissipator may be shaped to have an inner circumference and an outer circumference which extend around an axis of rotation of the rotor. Each of the sub-fins may have a length which extends in a radius direction of the rotor and includes a first and a second end portion opposed to each other. The first end portion extends until one of the inner and outer circumference of the heat dissipator. Each of the recesses of the sub-fins may change in depth at the second end portion. Each of the protrusions of the sub-fins may change in height at the second end portion. This creates smooth flows of the cooling air, thereby enhancing the dissipation of heat from the rectifying devices.

Each of the heat dissipator may have a through hole formed in a bottom surface of the recess. Each of the heat dissipator may alternatively be designed to have a cutout portion formed in the bottom surface of the recess. This ensures the stability in creating a flow of the cooling air through the recess and enhances the ability of the heat dissipator to dissipate the heat therefreom.

The depth of the recesses and the height of the protrusions are both less than the thickness of the heat dissipator. This facilitates the ease with which the sub-fins are made by pressing the second surface of the heat dissipator to form the recesses and the protrusions simultaneously and permits the mechanical strength of the heat dissipator to be controlled by regulating the amount of material of the heat dissipator which is to be left between each of the recesses and a corresponding one of the protrusions.

The width of the recesses is greater than that of the protrusions. This permits a plate to be deformed to make the sub-fins easily without stamping or punching out the plate.

The heat dissipator may be designed to include a main fin and an auxiliary fin. The main fin has the rectifying devices mounted thereon and an outer circumference extending around the rotor. The auxiliary fin is disposed on the outer circumference of the main fin and has the sub-fins formed thereon. The auxiliary fins work to create smooth flows of the cooling air from outside an outer periphery of the rectifier into the main fin, thereby enhancing the dissipation of heat from the rectifying devices installed on the main fin.

The heat dissipator has a slant shoulder formed between the main fin and the auxiliary fin. This facilitates the flow of cooling air from a high altitude (i.e., an upstream side) to a low altitude (i.e., a downstream side), thereby enhancing the introduction of the cooling air from the auxiliary fin to the main fin. The shoulder also functions to increase the mechanical strength of the heat dissipator, thereby decreasing the stress acting on the rectifying devices installed on the main fin.

The main fin may have through holes formed between the rectifying devices and the auxiliary fin. This directs flows of the cooling air moving along the sub-fins of the auxiliary fin behind the main fin. This results in an increase in heat dissipating area of the heat dissipator, thus enhancing the efficiency in cooling near the rectifying devices.

Each of the through hole lies between adjacent two of the sub-fins in a direction of rotation of the rotor. This ensures the stability of entry of the cooling air into the through holes with a small resistance without disturbing flows of the cooling air along the sub-fins, which leads to an increase in volume of the cooling air passing through the holes.

BRIEF DESCRIPTION OF THE DRAWINGS

The present invention will be understood more fully from the detailed description given hereinbelow and from the accompanying drawings of the preferred embodiments of the invention, which, however, should not be taken to limit the invention to the specific embodiments but are for the purpose of explanation and understanding only.

In the drawings.

DESCRIPTION OF THE PREFERRED EMBODIMENTS

Figure 1:
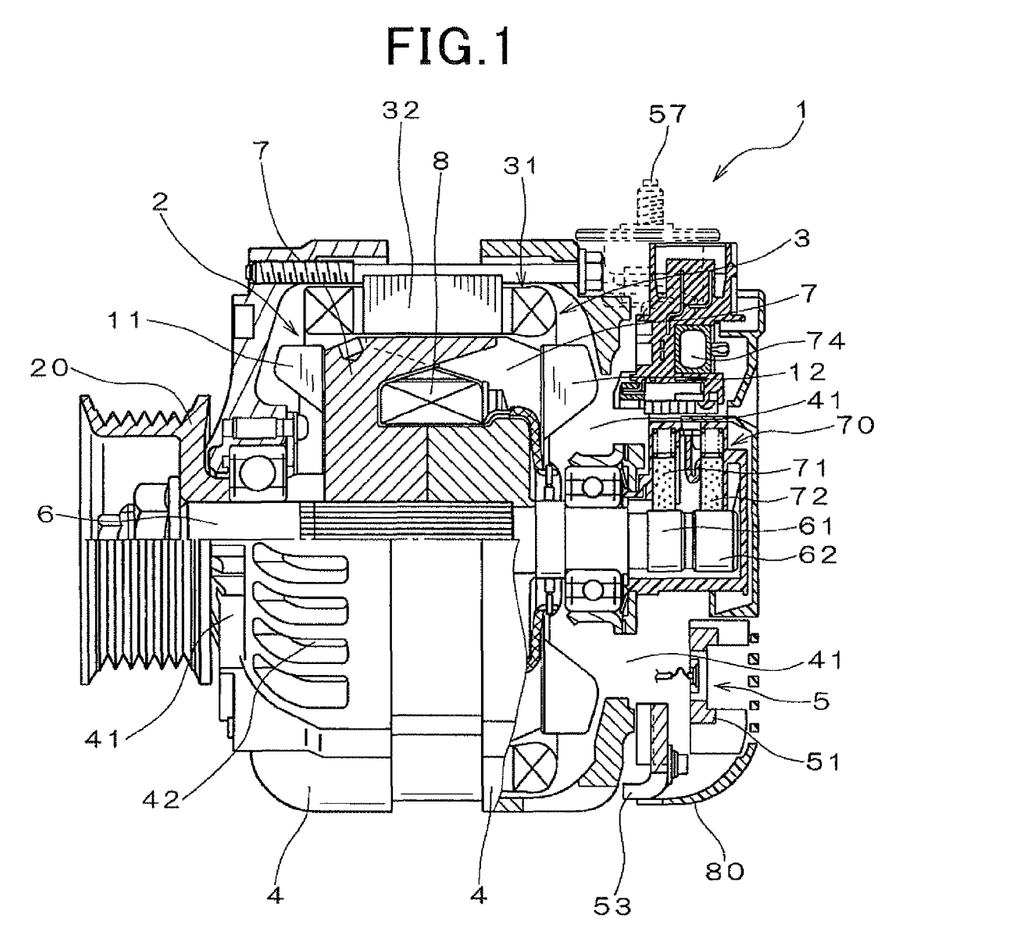
FIG. 1 is a partially longitudinal sectional view which shows the structure of an alternator according to the first embodiment.

Referring to the drawings, wherein like reference numbers refer to like parts in several views, particularly to FIG. 1, there is shown an AC generator or alternator 1 for automotive vehicles according to the first embodiment.

The alternator 1 consists essentially of a rotor 2, a stator 3, a frame assembly 4, and a rectifier 5.

The rotor 2 is, as clearly shown in FIG. 1, made up of a pair of pole cores 7 with claws and a field coil 8 retained between the pole cores 7. The field coil 8 is made of copper wire which is coated with an insulator and wound coaxially in the form of a cylindrical shape. A rotating shaft 6 is inserted through the pole cores 7. A cooling fan 11 is welded to an end wall of a front one (i.e., a left one, as viewed in FIG. 1) of the pole cores 7. The cooling fan 11 works to suck air from the front of the alternator 1 and discharge it axially and radially of the alternator 1. Similarly, a centrifugal fan 12 is welded to an end wall of a rear one of the pole cores 7 and works to suck air from the rear of the alternator 1 and discharge it radially of the alternator 1. The centrifugal fan 12 works as a cooling air generator to suck cooling air to the rotor 2 through the rectifier 5.

Slip rings 61 and 62 are formed on a rear end portion of the rotating shaft 6 in electrical connection with ends of the field coil 8. The alternator 1 also includes a brush unit 70 which works to feed electric power to the field coil 8 through the slip rings 61 and 62. The stator 3 is so disposed as to face the rotor 2 and includes a stator core 32 and a stator winding 31.

The frame assembly 4 retains the rotor 2 and the stator 3 therein. Specifically, the rotor 2 is supported to be rotatable about the rotating shaft 6. The stator 3 is placed around the outer periphery of the pole cores 7 through a given gap. The frame assembly 4 has cooling air outlets 42 formed in portions thereof facing the ends (also called coil ends) of the stator winding 31 of the stator 3. The frame assembly 4 also has cooling air inlets 41 formed in the ends thereof opposed to each other in the axial direction of the alternator 1.

The rotor 2 works to generate three-phase ac voltage at the three-phase stator winding 31 of the stator 3. The rectifier 5 works to rectify the three-phase ac voltage, as outputted from the three-phase stator winding 31, to produce dc voltage. The rectifier 5 is secured to the frame assembly 4 and equipped with a positive-side fin radiator 51 (also called a heat sink) on which positive rectifying devices are mounted, a negative-side fin radiator 53 (also called a heat sink) on which negative rectifying devices are mounted, a terminal board 55 in which connector terminals are embedded to establish electrical connections between the positive- and negative rectifying devices, and an output terminal (i.e., a positive terminal) 57 fitted in a hole extending through the positive fin radiator 51. The positive-side fin radiator 51 works to cool the positive rectifying devices and connect them electrically. Similarly, the negative-side fin radiator 53 works to cool the negative rectifying devices and connect them electrically. In short, the positive-side fin radiator 51 and the negative-side fin radiator 53 each function as a heat dissipator to dissipate or transfer thermal energy from a higher temperature to a lower temperature. The structure of the rectifier 5 will be described later in detail.

The brush unit 70 works to supply excitation current to the field coil 8 of the rotor 2 through the rectifier 5 and is equipped with brushes 71 and 72 which are biased elastically against the slip rings 61 and 62 on the rotating shaft 6 of the rotor 2, respectively. The frame assembly 4 is made of a front and a rear frame. The brush unit 70, the rectifier 5, and an IC regulator 74 are installed on the rear frame. A rear cover 80 is secured to the rear frame to cover the brush unit 70, the rectifier 5, the IC regulator 74, etc. to protect them physically.

In operation of the alternator 1, when the torque is transmitted from the engine (not shown) to the pulley 20 through a belt (not shown), it will cause the rotor 2 to rotate in a given direction. Application of excitation voltage to the field coil 8 of the rotor 2 will cause the claws of the pole cores 7 to be excited to develop the three-phase ac voltage at the stator windings 31. The rectifier 5 then outputs the dc power from the output terminal 57.

Figure 2:
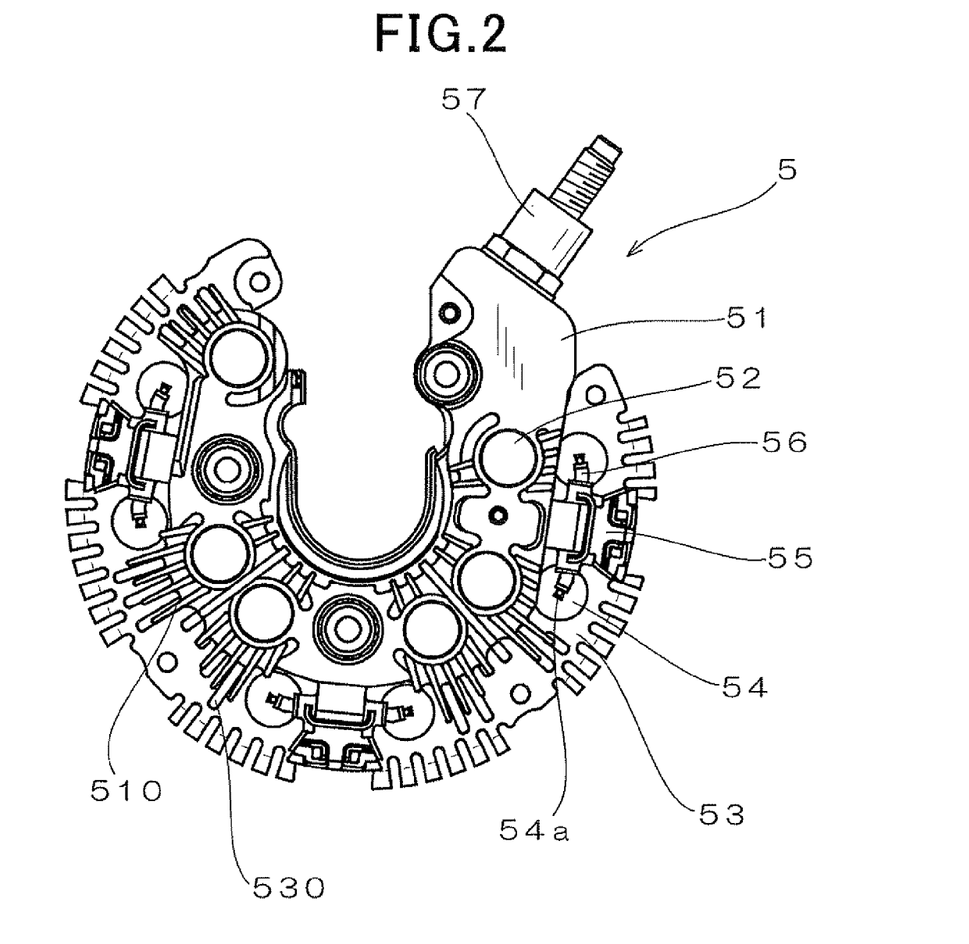
FIG. 2 is a plane view which shows a rectifier installed in the alternator of FIG. 1.
Figure 3:
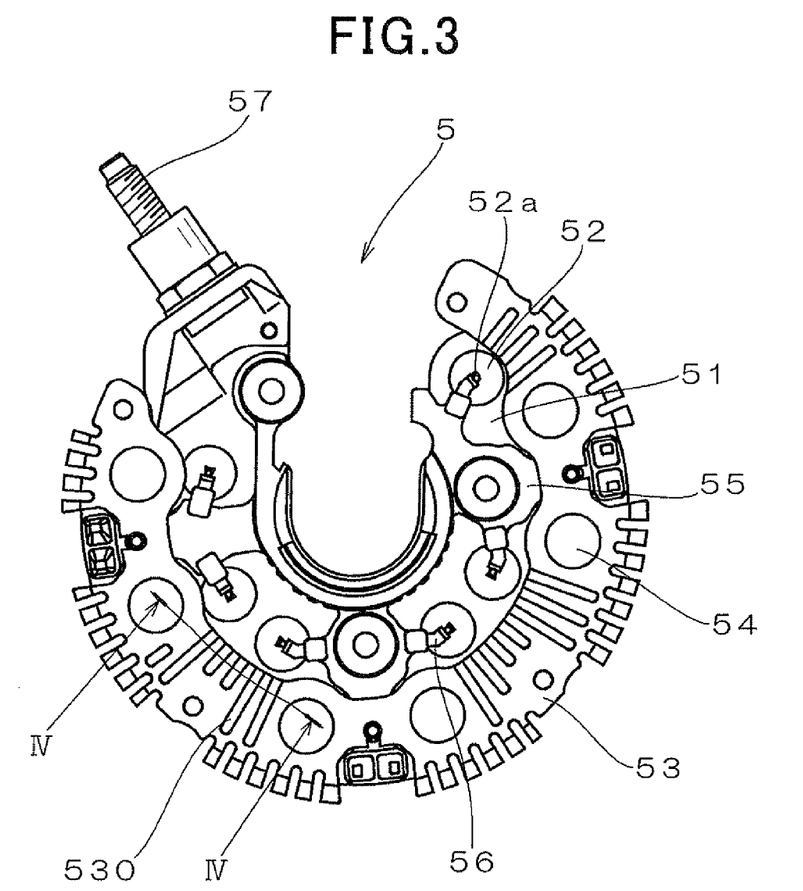
FIG. 3 is a rear view of the rectifier illustrated in FIG. 2.

The structure of the rectifier 5 will be described below in detail. FIG. 2 is a plan view of the rectifier 5. FIG. 3 illustrates the back of the rectifier 5. The rectifier 5 includes an assembly of the positive-side fin radiator 51 and the negative-side fin radiator 53 which are laid to overlap each other in the axial direction of the alternator 1. The rectifier 5 also includes the positive rectifying devices 52 installed in the positive-side fin radiator 51, the negative rectifying devices 54 installed in the negative-side fin radiator 53, and the terminal board 55.

The terminal board 55 supports the positive-side fin radiator 51 and the negative-side fin radiator 53 and is made of an insulating resin such as PPS (Polyphenylenesulfide) to electrically insulate the positive-side fin radiator 51 and the negative-side fin radiator 53 from each other. The terminal board 55 has electrically conductive terminals 56 which are disposed therein by resin-molding. The terminals 56 work to transmit the ac voltage, as produced by the stator 4, to the positive and negative rectifying devices 52 and 54. The positive rectifying devices 52 have leads 52a facing the negative-side fin radiator 53. Similarly, the negative rectifying devices 54 have leads 54a facing the positive-side fin radiator 52. Specifically, the positive rectifying devices 52 are fit in through holes formed in the positive side fin radiator 51. The negative rectifying devices 54 are fit in through holes formed in the negative-side fin radiator 53. The leads 52a and 54a of the positive rectifying devices 52 and the negative rectifying devices 54 are joined electrically with the terminals 56 of the terminal board 55 to form a full-wave rectifying bridge circuit.

In this embodiment, the positive-side fin radiator 51 has the six positive rectifying devices 52. Similarly, the negative-side fin radiator 53 has the six negative rectifying devices 54, thereby forming two pairs of full-wave rectifying bridge circuits along with the six positive rectifying devices 52. The positive-side fin radiator 51 has installed on an end thereof the output terminal 57 from which the dc current is outputted.

The positive-side fin radiator 51 has a plurality of sub-fins 510 formed on a major surface thereof which is opposite that on which the leads 52a of the positive rectifying devices 51 are disposed. The sub-fins 510 extend around the positive rectifying devices 52 perpendicular to the major surface of the positive-side fin radiator 51. When the rectifier 5 is installed in the alternator 1, the sub-fins 510 extend radially with respect to the rotating shaft 6. The positive-side fin radiator 51 is made of aluminum or aluminum alloy and molded by the die-casting. The sub-fins 510 are simultaneously formed.

The negative-side fin radiator 53 has a plurality of sub-fins 530 form on a major surface thereof which is opposite that on which the leads 54a of the negative rectifying devices 54 are disposed. The sub-fins 530 extend mainly between adjacent two of the negative rectifying devices 54 perpendicular to the major surface of the negative-side fin radiator 53. When the rectifier 5 is installed in the alternator 1, the sub-fins 530 extend radially with respect to the rotating shaft 6. The negative-side fin radiator 53 is, unlike the positive-side fin radiator 51, made by pressing an aluminum plate. The sub-fins 530 are simultaneously formed.

Figure 4:
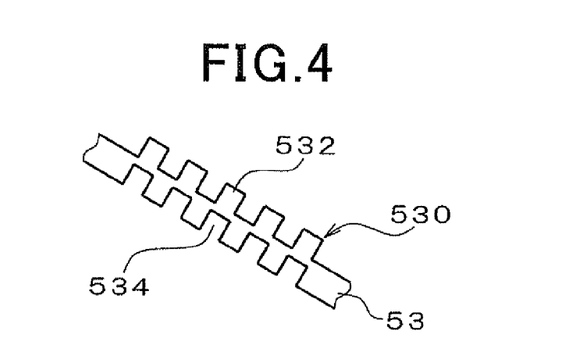
FIG. 4 is an enlarged sectional view, as taken along the line IV-IV in FIG. 3.
Figure 5:
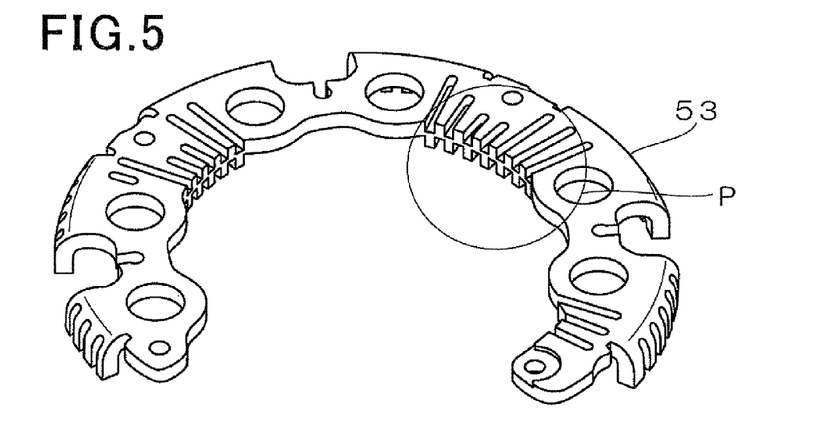
FIG. 5 is a perspective view which illustrates a negative-side fin radiator.
Figure 6:
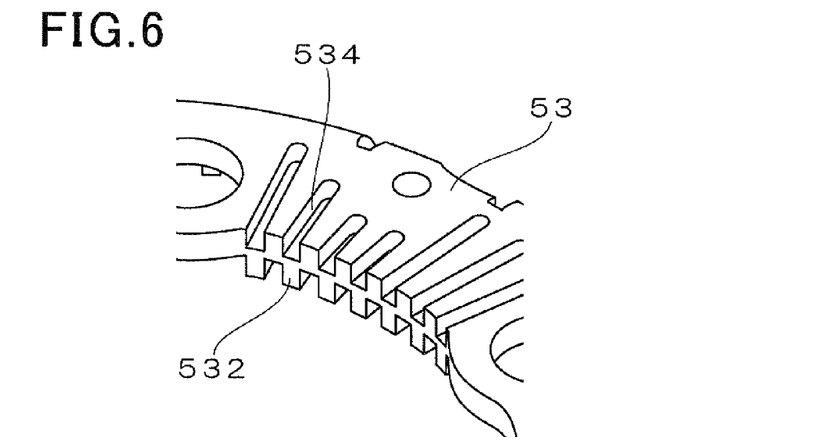
FIG. 6 is a partial perspective view which illustrates a portion P of the negative-side fin radiator of FIG. 5.
Figure 7:
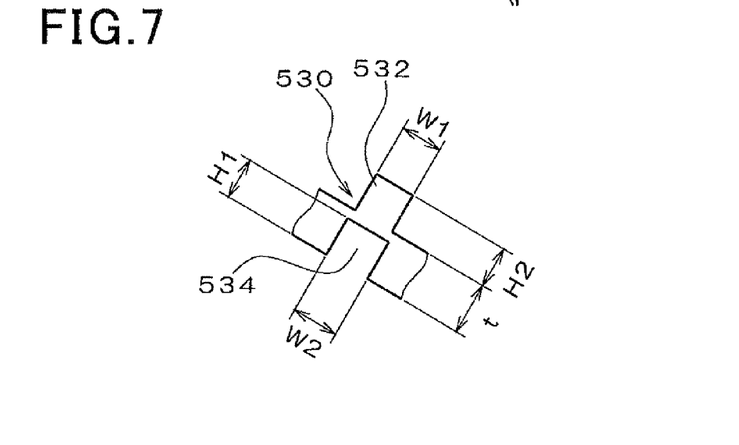
FIG. 7 is a view which demonstrates dimensions of sub-fins of a negative-side fin radiator.

FIG. 4 is an enlarged sectional view, as taken along the line IV-IV in FIG. 3. FIG. 5 is a perspective view which illustrates the negative-side fin radiator 53 before the negative rectifying devices 54 are installed. FIG. 6 is a partial perspective view which illustrates a portion P of the negative-side fin radiator 53 of FIG. 5. FIG. 7 is a view which demonstrates dimensions of the sub-fins 530. Each of the sub-fins 530 of the negative-side fin radiator 53 is made up of a combination of a protrusion 532 formed on one of the major surfaces (which will also be referred to as a first surface) of the negative-side fin radiator 53 and a recess 534 formed in the other major surface (which will also be referred to as a second surface) in alignment or parallel with the protrusion 532 in the radius direction of the negative-side fin radiator 53. In other words, each of the protrusions 532 and a corresponding one of the recesses 532 are located in coincidence with teach other in a direction of thickness (i.e., a distance between the first and second surfaces) of the negative-side fin radiator 53. The protrusions 532 and the recesses 534 are formed simultaneously by pressing the negative-side fin radiator 53 of a thickness t to have a desired outer shape and mount holes for the negative-rectifying devices 54. The protrusions 532 and the recesses 534 may alternatively be formed separately after the essential part of the negative-side fin radiator 53 is finished.

Each of the recesses 534 has a depth H1, as illustrated in FIG. 7. Each of the protrusions 532 has a height H2. The depth H1 and the height H2 are less than the thickness t of the negative-side fin radiator 53. Each of the recesses 534 has a width W2 which is slightly greater than a width W1 of the protrusions 532. These dimensions facilitate the ease with which the sub-fins 530 are made by pressing the plate to form the recesses 534 and the protrusions 532 simultaneously. The mechanical strength of the negative-side fin radiator 53 may be controlled by regulating the amount of material of the negative-side fin radiator 53 to be left between each of the recesses 543 and a corresponding one of the protrusions 532. The width W2 of the recesses 534 is, as described above, greater than the width W1 of the protrusions 532, thereby facilitating the ease with which the plate is deformed to make the sub-fins 530 without stamping or punching out the plate.

Each of the sub-fins 530 (i.e., the protrusions 532 and the recesses 534) has a length extending from an inside edge of the negative-side fin radiator 53 in the radial direction of the negative-side fin radiator 53. In other words, the negative-side fin radiator 53 has an outer and inner circumference extending around the axis of rotation of the rotor 2. The length of the sub-fins 530 has a first end portion and a second end portion aligning with each other. The first end portion extends to the inner circumference of the negative-side fin radiator 53 and has an inner edge lying at the inner circumference of the negative-side fin radiator 53. The second end portion may alternatively be shaped to extend until the outer circumference of the negative-side fin radiator 53. Each of the recesses 534 defines a groove which has an end opening to the inside edge of the negative-side fin radiator 53, thereby smoothing the flow of air through the inner end of the sub-fin 530 to enhance the cooling ability of the negative-side fin radiator 53.

Each of the sub-fins 530 of the rectifier 5 of the alternator 1 is, as described above, formed by pressing the plate to simultaneously form the recess 534 and the protrusion 532 which are laid to overlap each other in the thickness-wise direction of the plate, thus permitting the heat-dissipating area of the negative-side fin radiator 53 to be increased to ensure a desired degree of heat capacity thereof as compared to when circular or elongated holes are formed in the negative-side fin radiator 53, like the prior art structure discussed in the introductory part of this application. The press forming of the sub-fins 530 results in no burr between adjacent two of the sub-fins 530, thereby eliminating the need of an additional process of finishing the sub-fins 530, which leads to a decrease in production cost of the rectifier 5.

While the present invention has been disclosed in terms of the preferred embodiment in order to facilitate better understanding thereof, it should be appreciated that the invention can be embodied in various ways without departing from the principle of the invention. For instance, each of the sub-fins 530 of the negative-side fin radiator 53 may be designed to have a radially outside end defined by a closed wall extending perpendicular to the major surface of the negative-side fin radiator 53. Alternatively, each of the protrusions 532 may be shaped to have the height H2 which decreases gradually at a given rate as approaching the radially outside end. Each of the recesses 534 may be shaped to have the depth H1 which decreases gradually at a given rate as approaching the radially outside end.

Figure 8:
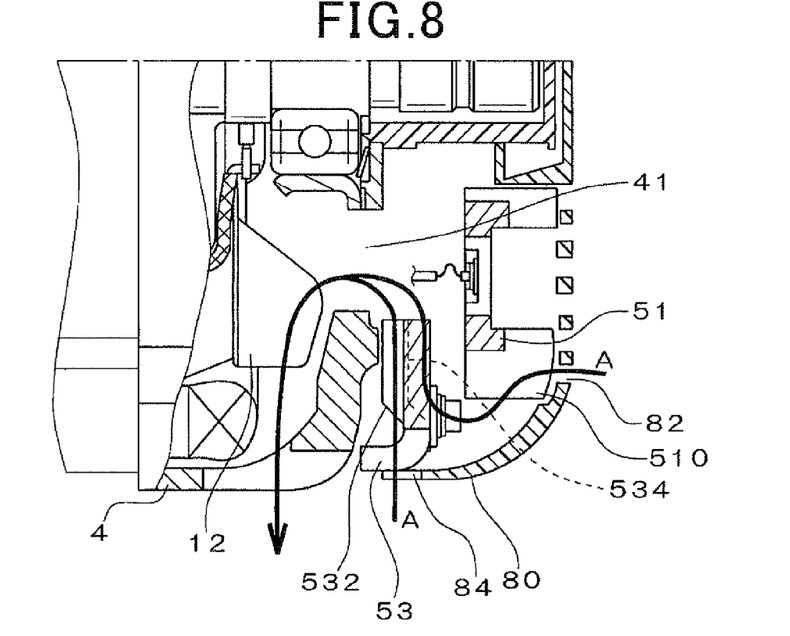
FIG. 8 is a partial sectional view which illustrates a modification of the alternator of FIG. 1.

FIG. 8 is a partial sectional view which illustrates a modification of the alternator 1 in which radially outside portions of the protrusion 532 and the recess 534 of each of the sub-fins 530 are changed in shape gradually. Specifically, the protrusion 532 has a length extending parallel to the radius direction of the negative-side fin radiator 53 (i.e., the rotor 2). The portion of the length of the protrusion 532 which lies outward in the radius direction of the negative-side fin radiator 53 decreases in height at a given rate as approaching the outside edge thereof, in other words, it tapers toward the outside edge thereof. Similarly, the protrusion recess 534 has a length extending parallel to the radius direction of the negative-side fin radiator 53 (i.e., the rotor 2). The portion of the length of the recess 534 which lies outward in the radius direction of the negative-side fin radiator 53 decreases in depth at a given rate as approaching the outside edge thereof, in other words, it tapers toward the outside edge thereof.

An arrow A in FIG. 8 represents one of the flows of cooling air, as produced by rotation of the cooling fan 12 installed on the rear of the rotor 2. The cooling air is drawn into a rear cover 80 of the alternator 1 and made up of two streams of air: one is sucked through an axial inlet 82 formed in a portion of the rear cover 80 which faces axially of the alternator 1, and the other is sucked through a radial inlet 84 formed in a portion of the rear cover 80 which faces radially of the alternator 1.

After taken through the axial inlet 82, the stream of cooling air passes between the sub-fins 510 of the positive-side fin radiator 51 toward the surface of the negative-side fin radiator 53, enters the recesses 534, moves inwardly of the negative-side fin radiator 53, and then is sucked into the frame assembly 4 through the inlet 41. The tapered outside portions of the recesses 534 work to facilitate the entry of the stream of cooling air into the inlet 41 through the recesses 534, thereby avoiding the generation of a turbulent flow of air around the outside ends of the recesses 534.

The stream of cooling air, as taken through the radial inlet 84 or a gap between the rear cover 80 and the frame assembly 4, passes over the back surface of the negative-side fin radiator 53 along the protrusions 532 (i.e., through a gap between the protrusions 532), moves inwardly of the negative-side fin radiator 53, and then is sucked into the frame assembly 4 through the inlet 41. The tapered outside portions of the protrusions 532 work to facilitate the entry of the stream of cooling air into the gap between adjacent two of the protrusions 532 after it hits the outside ends of the protrusions 532, thereby avoiding the generation of a turbulent flow of air around the outside ends of the protrusions 532.

The negative-side fin radiator 53 has an outer circumference which is, as can be seen from FIGS. 1 and 5, curved toward the frame assembly 4, but however, it may alternatively be bent outwardly toward an air flow path through which the cooling air, as entered from the radial inlet 82, as illustrated in FIG. 8, passes. This geometry of the negative-side fin radiator 53 facilitates the introduction of cooling air, as taken from the axial inlet 82, toward the front surface of the negative-side fin radiator 53 and is useful especially in the case where an air gap between the circumference of the negative-side fin radiator 53 and the inner wall of the rear cover 80 is relatively great. Specifically, the outward bent of the circumference of the negative-side fin radiator 53 serves to disturb the entry of the cooling air into the air gap and feed as much air as possible toward the sub-fins 530 of the negative-side fin radiator 53.

The recess 534 of each of the sub-fins 530 of the negative-side fin radiator 53, as described above, extends until the inner circumferential edge of the negative-side fin radiator 53, but however, may alternatively be changed in structure. For instance, a through hole, a cutout, or a slit is formed in a radially inner end portion of the bottom of each of the recesses 534 to introduce the cooling air, as flowing into the recess 534, to the inlet 41 through the hole, cutout, or slit.

Figure 9:
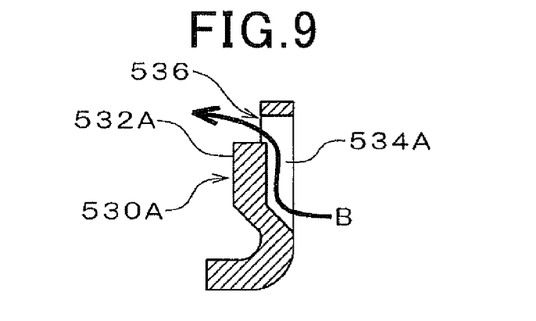
FIG. 9 is a partially sectional view which illustrates a modified form of a sub-fin disposed on a negative-side fin radiator.

FIG. 9 is a partially sectional view which illustrates a sub-fin 530A that is a modified form of each of the sub-fins 530 of the negative-side fin radiator 53. The sub-fin 530A is made up of a protrusion 532A and a recess 534A and basically identical in structure with the sub-fin 530, as described above, except for the following points. The recess 534A does not directly open to the inlet 41 formed inwardly of the negative-side fin radiator 53 and has a closed inner end wall formed by a thickness of the negative-side fin radiator 53. The recess 534A also has a through hole 536 formed in the bottom thereof close to the inner end wall. The through hole 536 is, as can be seen from the drawing, exposed to the inner end of the protrusion 532A. In other words, the length of the protrusion 532A is shorter than that of the recess 534A by the diameter of the through hole 536. The cooling air, having entered the recess 534A, flows, as indicated by an arrow B, through the hole 536 to the back surface of the negative-side fin radiator 53 (i.e., the inlet 41 in FIG. 8), thereby enhancing the heat dissipating ability of the negative-side fin radiator 53.

Figure 10:
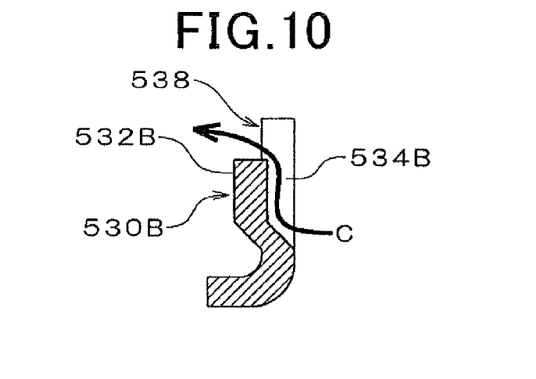
FIG. 10 is a partially sectional view which illustrates a modified form of a sub-fin disposed on a negative-side fin radiator.

FIG. 10 is a partially sectional view which illustrates a sub-fin 530B that is a modified form of each of the sub-fins 530 of the negative-side fin radiator 53. The sub-fin 530B is made up of a protrusion 532BA and a recess 534B and basically identical in structure with the sub-fin 530, as described above, except for the followings. The recess 534B has a cutout portion 538 formed in the bottom thereof close to the inner circumference of the negative-side fin radiator 53. The cutout portion 538 is defined by an open inner end and an open bottom of the recess 534B. The length of the protrusion 532B is, therefore, shorter than that of the recess 534B by the size of the cutout portion 538. The cooling air, as having entered the recess 534B, flows, as indicated by an arrow C, through the cutout portion 538 to the back surface of the negative-side fin radiator 53 (i.e., the inlet 41 in FIG. 8), thereby enhancing the heat dissipating ability of the negative-side fin radiator 53.

The positive-side fin radiator 51 is, as described above, made by die-casting aluminum, but may alternatively be made of a pressed plate, while the negative-side fin radiator 53 may be made by die-casting aluminum. Both the positive-side fin radiator 51 and the negative-side fin radiator 53 may be made by pressing plates.

Figure 11:
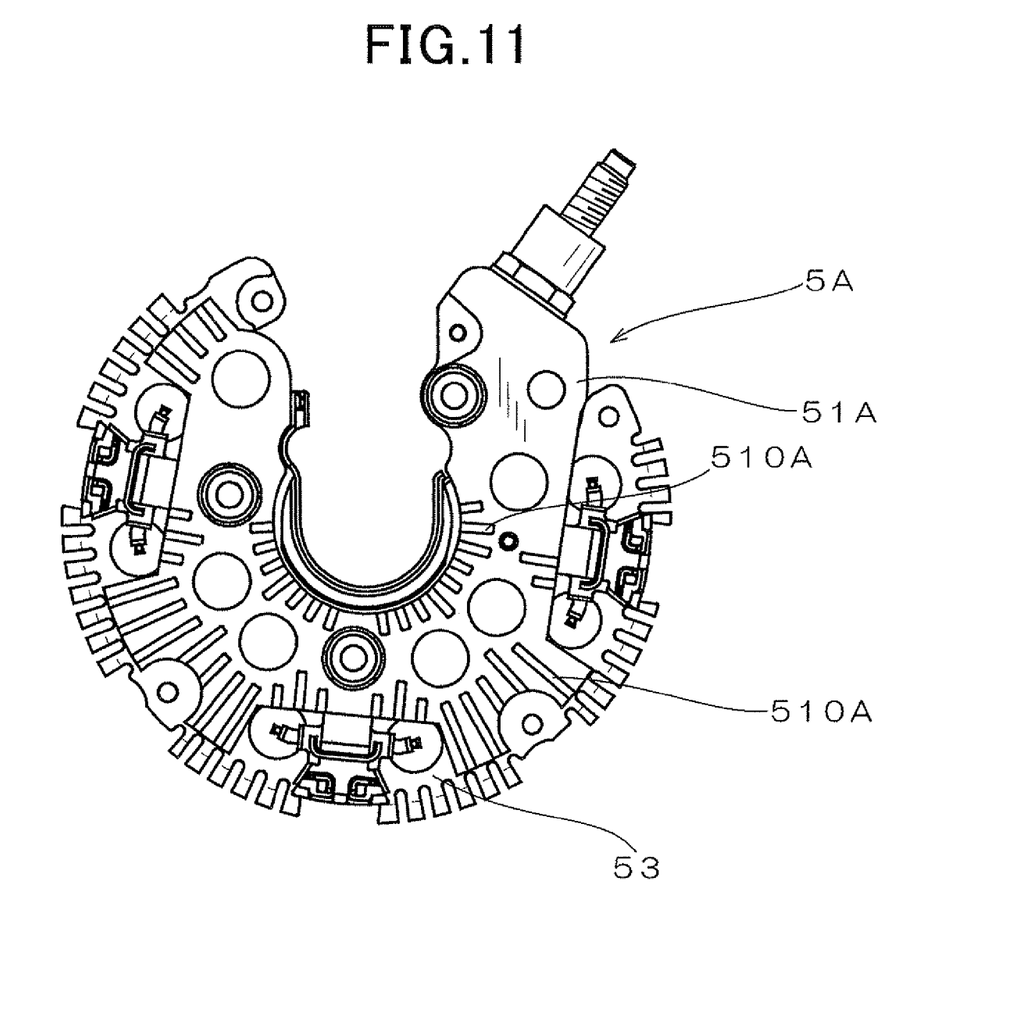
FIG. 11 is a plane view which illustrates a modification of a rectifier installed in the alternator of FIG. 1.

FIG. 11 is a plane view which illustrates a rectifier 5A that is a modified form of the rectifier 5 of the first embodiment. The rectifier 5A is equipped with the positive-side fin radiator 51A and the negative-side fin radiator 53 which are both made of pressed plates. Specifically, the rectifier 5A has the positive-side fin radiator 51A instead of the positive-side fin radiator 51 of the rectifier 5 of FIG. 2. The positive-side fin radiator 51A is, like the negative-side fin radiator 53, made by pressing an aluminum plate. The positive-side fin radiator 51A is equipped with a plurality of sub-fins 510A which are formed simultaneously with the formation of a major portion of the positive-side fin radiator 51A. The sub-fins 510A are so oriented as to extend substantially radially from the rotating shaft 6 when the rectifier 5A is installed in the alternator 1. The positive-side fin radiator 51A and the sub-fins 510A may be made using separate press dies.

The sub-fins 510A are broken down into two groups: one is an inside group lying around the inner periphery of the positive-side fin radiator 51A and the other is an outside group lying around the outer periphery of the positive-side fin radiator 51A. Each of the sub-fins 510A is identical in structure with the sub-fins 530, as illustrated in FIG. 4, and includes a protrusion formed on one of major surfaces of the positive-side fin radiator 51A which faces the rear cover 80 and a groove or recess formed on the other major surface of the positive-side fin radiator 51A. The protrusion and the recess are laid in coincidence with teach other in the thickness-wise direction of the positive-side fin radiator 51A. The inside group or the outside group may be omitted.

When the sub-fins 510A and 530 of the positive-side fin radiator 51A and the negative-side fin radiator 53 are formed on the positive-side fin radiator 51A and the negative-side fin radiator 53 by the press molding technique, there will be four combinations of locations and orientations of the sub-fins 510A and 530, as illustrated in FIGS. 12(a) to 12(d).

Figure 12A:
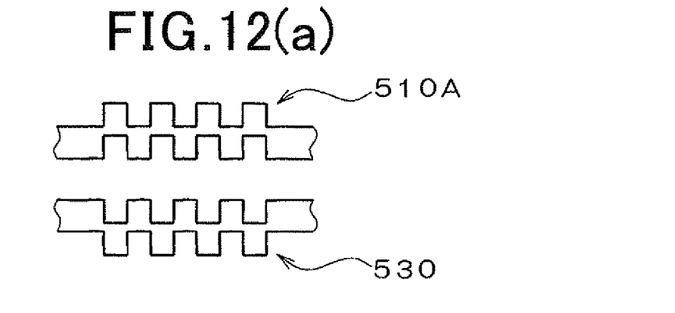
FIGS. 12(a), 12(b), 12(c), and 12(d) are views which show modifications of layouts of sub-fins of a positive-side and a negative-side fin radiators.

FIG. 12(a) illustrates the sub-fins 510A and the sub-fins 530 which extend parallel to each other. The recesses of the sub-fins 510A face those of the sub-fins 530, while the protrusions of the sub-fins 510A project in a direction opposite that in which the protrusions of the sub-fins 530 project. In other words, the sub-fins 510A and the sub-fins 530 are mirror-image symmetrical with each other.

Figure 12B:
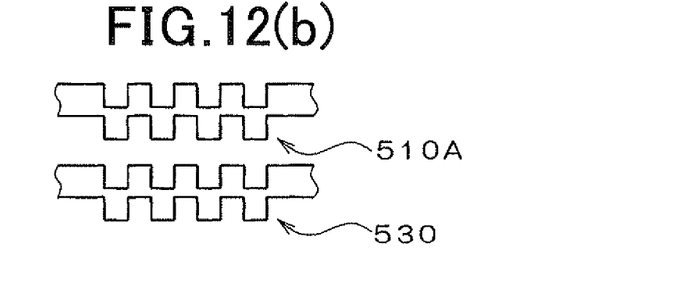

FIG. 12(b) illustrates the sub-fins 510A and the sub-fins 530 which extend parallel to each other, but each of the recesses of the sub-fins 530 faces one of the protrusions of the sub-fins 510A. The protrusions of the sub-fins 530 are formed farther away from the recesses of the sub-fins 510A. In other words, the protrusions of the sub-fins 530 are formed on one of outer opposed surfaces of an assembly of the positive-side fin radiator 51A and the negative-side fin radiator 53, while the recesses of the sub-fins 510A are formed in the other outer surface of the assembly.

Figure 12C:
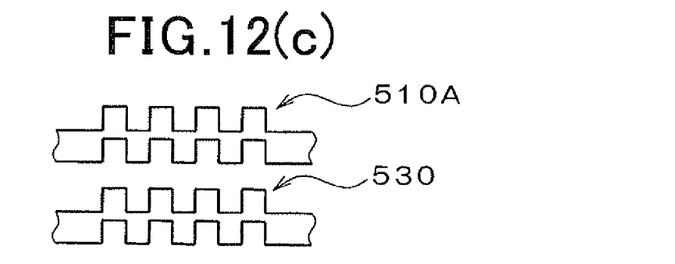

FIG. 12(c) illustrates the sub-fins 510A and the sub-fins 530 which extend parallel to each other, but each of the protrusions of the sub-fins 530 faces one of the recesses of the sub-fins 510A. The protrusions of the sub-fins 510A are formed farther away from the recesses of the sub-fins 530. In other words, the protrusions of the sub-fins 510A are formed on one of the outer opposed surfaces of the assembly of the positive-side fin radiator 51A and the negative-side fin radiator 53, while the recesses of the sub-fins 530 are formed in the other outer surface of the assembly.

Figure 12D:
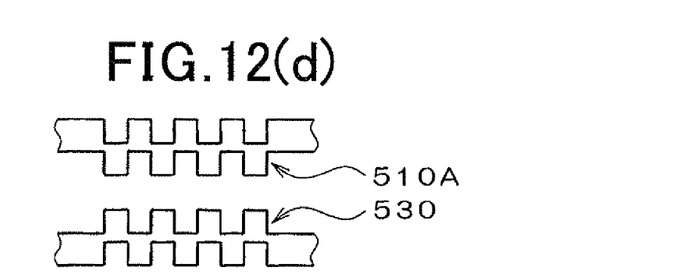

FIG. 12(d) illustrates the sub-fins 510A and the sub-fins 530 which extend parallel to each other, but the protrusions of the sub-fins 510A face those of the sub-fins 530, while the recesses of the sub-fins 510A open in a direction, opposite that in which the recesses of the sub-fins 530 open. In other words, the sub-fins 510A and the sub-fins 530 are mirror-image symmetrical with each other.

The sub-fins 510A and the sub-fins 530, as illustrated in each of the FIGS. 12(a) to 12(d), extend in alignment with each other in the radius direction of the positive-side fin radiator 51A and the negative-side fin radiator 53, but may alternatively be offset or staggered from each other in the circumferential direction of the positive-side fin radiator 51A and the negative-side fin radiator 53.

The recesses 534 of the sub-fins 530 of the inside group have inner ends opening to the inner circumference of the negative-side fin radiator 53, but may be designed to have open outer ends and the closed inner ends or both the outer and inner ends which open to the inner circumference of the negative-side fin radiator 53.

Figure 13:
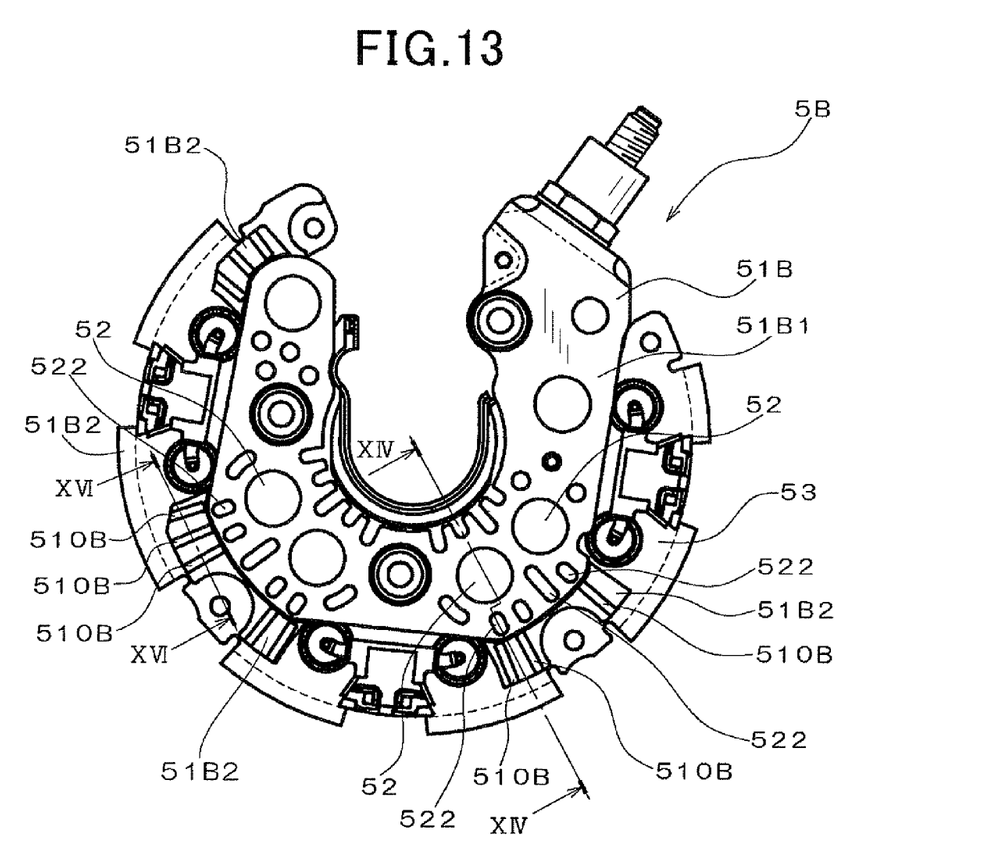
FIG. 13 is a plane view which illustrates a modification of a rectifier installed in the alternator of FIG. 1 which is equipped with auxiliary fins disposed on a positive-side fin radiator.
Figure 14:
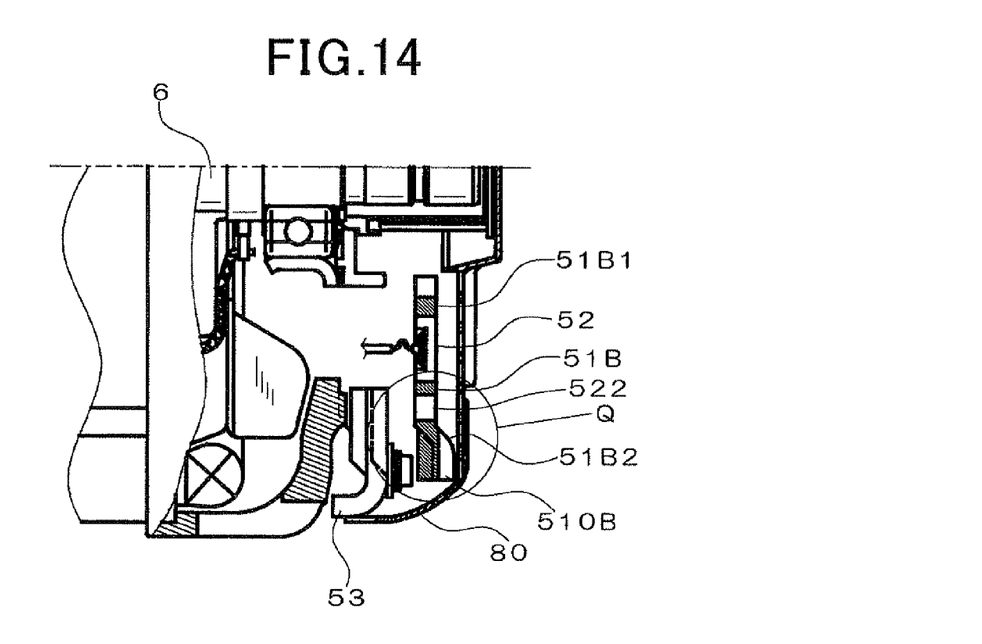
FIG. 14 is a partial sectional view which illustrates a modification of the alternator of FIG. 1.
Figure 15:
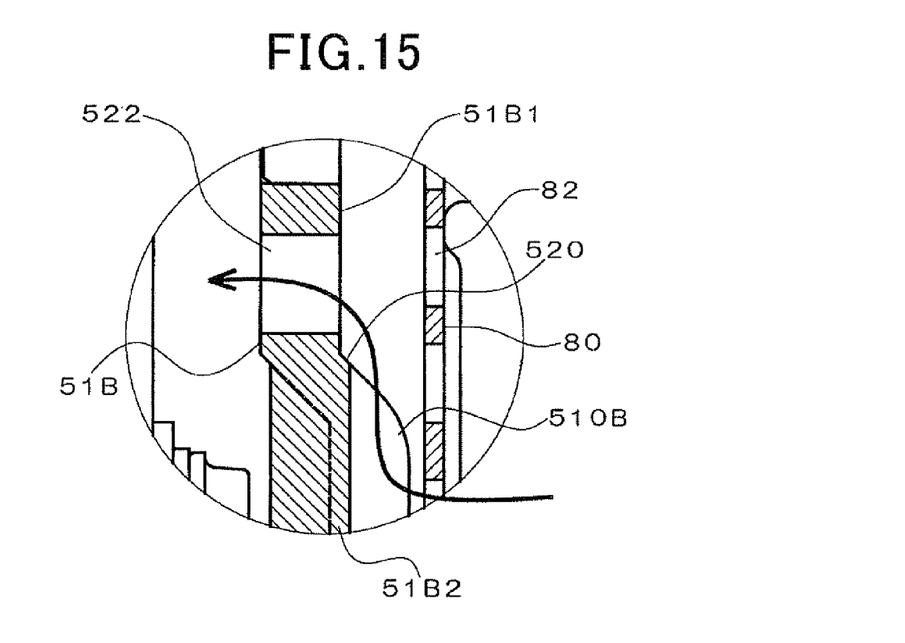
FIG. 15 is a partially enlarged view of a portion Q of the alternator, as illustrated in FIG. 14.
Figure 16:
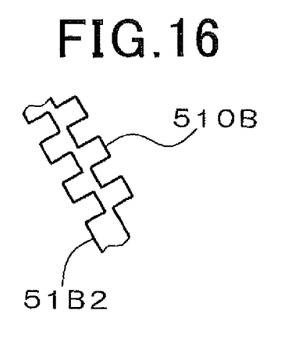
FIG. 16 is a partially enlarged sectional view, as taken along the line XVI-XVI of FIG. 13.

FIG. 13 illustrates a rectifier 5B that is a modified form of the rectifier 5. FIG. 14 is a partially sectional view, as taken along the line XIV-XIV of FIG. 13, which illustrates the alternator 1 in which the rectifier 5B is installed. FIG. 15 is a partially enlarged view of a portion Q of the alternator 1, as illustrated in FIG. 14. FIG. 16 is a partially enlarged sectional view, as taken along the line XVI-XVI of FIG. 13.

The rectifier 5B is equipped with the positive-side fin radiator 51B and the negative-side fin radiator 53. The rectifier 5B is different from the rectifier 5 of FIG. 2 only in that the positive-side fin radiator 51B is used instead of the positive-side fin radiator 51. The positive-side fin radiator 51B is, like the negative-side fin radiator 53, made by pressing an aluminum plate and equipped with a main fin 51B1 in which the positive rectifying devices 52 are installed and three auxiliary fins 51B2 extending radially from the outer periphery (i.e., the outer circumference extending around the rotor 2) of the main fin 51B1. Each of the auxiliary fins 51B2 has a plurality of sub-fins 510B extending radially of the rotating shaft 6 of the alternator 1. The auxiliary fins 51B2 work to create smooth flows of cooling air, as indicated by an arrow in FIG. 15, from outside the outer periphery of the rectifier 5B into the main fin 51B1, thereby enhancing the dissipation of heat from the positive rectifying devices 52 installed on the main fin 51B1.

The positive-side fin radiator 51B, as clearly illustrated in FIG. 15, has a slant shoulder 520 between the main fin 51B1 and each of the auxiliary fins 51B2. The shoulder 520 continues from the inner periphery of each of the auxiliary fins 51B2. The recess and the protrusion defining each of the sub-fins 51B have slant end walls so that the inner end surface of the protrusion is inclined to the major surface of the positive-side fin radiator 51B in alignment with the outer surface of the shoulder 520. In other words, the inclination of the inner end surface of the protrusion is identical with that of the outer surface of the shoulder 520. This facilitates the flow of cooling air from a high altitude (i.e., an upstream side) to a low altitude (i.e., a downstream side), thereby enhancing the introduction of the cooling air from the auxiliary fin 51B2 to the main fin 51B1. The shoulder 520 also functions to increase the mechanical strength of the positive-side fin radiator 51B, thereby decreasing the stress acting on the positive rectifying devices 52 installed on the main fin 51B1.

The main fin 51B1 of the positive-side fin radiator 51B, as clearly illustrated in FIG. 13, has through holes 522 formed between the positive rectifying devices 52 and each of the auxiliary fins 51B2 to direct flows of cooling air moving along the sub-fins 510B of the auxiliary fin 51B2 behind the main fin 51B1. This results in an increase in heat dissipating area of the positives-side fin radiator 51 together with the auxiliary fins 51B2. The through holes 522 are located between the positive rectifying devices 52 and each of the auxiliary fins 51B2, thus enhancing the efficiency in cooling near the positive rectifying devices 52. Each of the through holes 522, as can be seen from FIG. 13, lies between adjacent two of the sub-fins 510B in the circumferential direction of the positive-side fin radiator 51B (i.e., the direction of rotation of the rotor 2). In other words, each of the through holes 522 is oriented out of alignment with the sub-fins 510B, thereby ensuring the stability of entry of the cooling air into the through holes 522 with a small resistance without disturbing the flows of cooling air along the sub-fins 510B.

The negative-side fin radiator 53 may alternatively designed to have the same structure as that of the positive-side fin radiator 51B equipped with the main fin 51B1 and the auxiliary fins 51B2. The shoulders 520 formed between the main fin 51B1 and the auxiliary fins 51B2 or the through holes 522 of the main fin 51B1 may be omitted.

Each of the sub-fins 503 of the negative-side fin radiator 53 is, as described above, formed by the combination of the recess 534 and the protrusion 532. The recess 534 is defined by, for example, a groove. The protrusion 532 is defined by, for example, an elongated ridge. The recess 534 and the protrusion 532 are arrayed in parallel to each other in the thickness-wise direction of the negative-side fin radiator 53. The combinations of the recesses 534 and the protrusions 532 are made by the press working of a metallic plate. This structure of the negative-side fin radiator 53 permits the heat-dissipating area to be increased, which ensures a desired degree of heat capacity thereof as compared to when circular or elongated holes are formed in the negative-side fin radiator 53. The press working of the sub-fins 530 results in no burr between adjacent two of the sub-fins 530, thereby eliminating the need of an additional process of finishing the sub-fins 530, which leads to a decrease in production cost of the rectifier 5.

What is claimed is:

1. An alternator for a vehicle comprising:
a frame;
a rotor retained by the frame;
a stator which is so retained by the frame as to face the rotor, the stator working to produce ac voltage along with the rotor;
a rectifier retained by the frame, the rectifier including rectifying devices to rectify the ac voltage into dc voltage;
a heat dissipator which is disposed in the rectifier and has a first and a second surface opposed to each other through a given thickness, the heat dissipator working to establish an electrical communication between the rectifying devices and cool the rectifying devices;
a cooling air generator which generates a flow of cooling air toward the rotor through the heat dissipator in the rectifier; and
a plurality of sub-fins provided on the heat dissipator, each of the sub-fins being defined by a combination of a protrusion formed on the first surface of the heat dissipator and a recess formed in the second surface of the heat dissipator in coincidence with the protrusion in a direction of the given thickness;
wherein a width of the recesses is greater than a width of the protrusions.

2. An alternator as set forth in claim 1, wherein the heat dissipator is made of a plate which is pressed to form the recesses and the protrusions of the sub-fins.

3. An alternator as set forth in claim 1, wherein the sub-fins extend radially of an axis of rotation of the rotor.

4. An alternator as set forth in claim 3, wherein each of the recesses of the sub-fins has a length which extends in a radius direction of the rotor and has an end portion changing in depth thereof at a given rate, and wherein each of the protrusions of the sub-fins has a length which extends in a radius direction of the rotor and has an end portion changing in height thereof at a given rate.

5. An alternator as set forth in claim 3, wherein the heat dissipator is shaped to have an inner circumference and an outer circumference which extend around an axis of rotation of the rotor, wherein each of the sub-fins has a length which extends in a radius direction of the rotor and includes a first and a second end portion opposed to each other, the first end portion extending until one of the inner and outer circumference of the heat dissipator, and wherein each of the recesses of the sub-fins changes in depth at the second end portion, each of the protrusions of the sub-fins changing in height at the second end portion.

6. An alternator as set forth in claim 1, wherein each of the heat dissipator has a through hole formed in a bottom surface of the recess.

7. An alternator as set forth in claim 1, wherein each of the heat dissipator has a cutout portion formed in a bottom surface of the recess.

8. An alternator as set forth in claim 1, wherein a depth of the recesses and a height of the protrusions are both less than a thickness of the heat dissipator.

9. An alternator as set forth in claim 1, wherein the heat dissipator includes a main fin and an auxiliary fin, the main fin having the rectifying devices mounted thereon and an outer circumference extending around the rotor, and wherein the auxiliary fin is disposed on the outer circumference of the main fin and has the sub-fins formed thereon.

10. An alternator as set forth in claim 9, wherein the heat dissipator has a slant shoulder formed between the main fin and the auxiliary fin.

11. An alternator as set forth in claim 10, wherein the main fin has through holes formed between the rectifying devices and the auxiliary fin.

12. An alternator as set forth in claim 11, wherein each of the through hole lies between adjacent two of the sub-fins in a direction of rotation of the rotor.

* * * * *